United States Patent [19]

Raines et al.

[11] 4,303,196
[45] Dec. 1, 1981

[54] TEMPERATURE SENSITIVE VALVE

[76] Inventors: Arnold Raines, Apt. 203, 350 E. California, Pasadena, Calif. 91105; William August, 1589 Morada Pl., Altadena, Calif. 91001

[21] Appl. No.: 133,554

[22] Filed: Mar. 24, 1980

[51] Int. Cl.³ .................. G05D 23/00; A23F 31/00
[52] U.S. Cl. .................................. 236/88; 99/283; 251/65
[58] Field of Search .............. 236/88, 93 R; 219/495; 99/280, 283; 251/65

[56] References Cited

U.S. PATENT DOCUMENTS

| | | | |
|---|---|---|---|
| 2,601,579 | 6/1952 | Wittmann | 236/88 |
| 2,678,774 | 5/1954 | Arvin | 236/88 X |
| 3,442,199 | 5/1969 | McGrail | 99/283 |

Primary Examiner—William E. Wayner
Attorney, Agent, or Firm—Christie, Parker & Hale

[57] ABSTRACT

A temperature sensitive valve in which the annular valve seat is made of a thermal sensitive magnetic material having a Curie temperature that is of a preselected value. A vertically movable valve plug is positioned below the valve seat and contains a permanent magnet which normally urges the plug up into the valve seat to close the valve, but which allows the valve to open when the temperature of the valve seat exceeds the Curie temperature.

8 Claims, 4 Drawing Figures

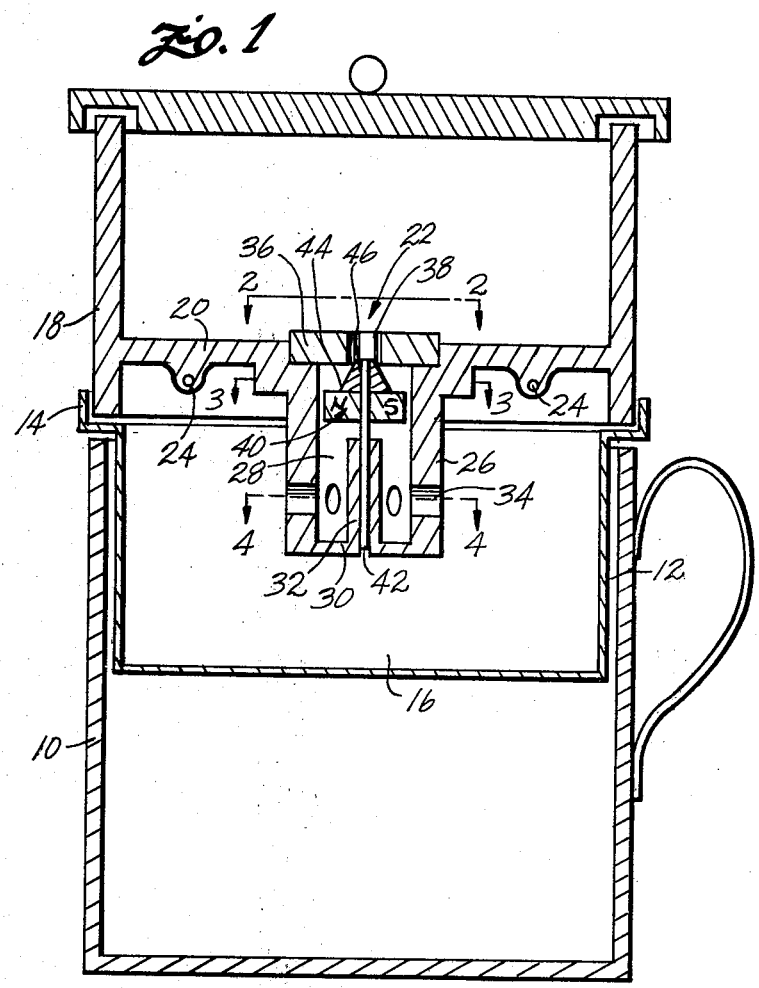
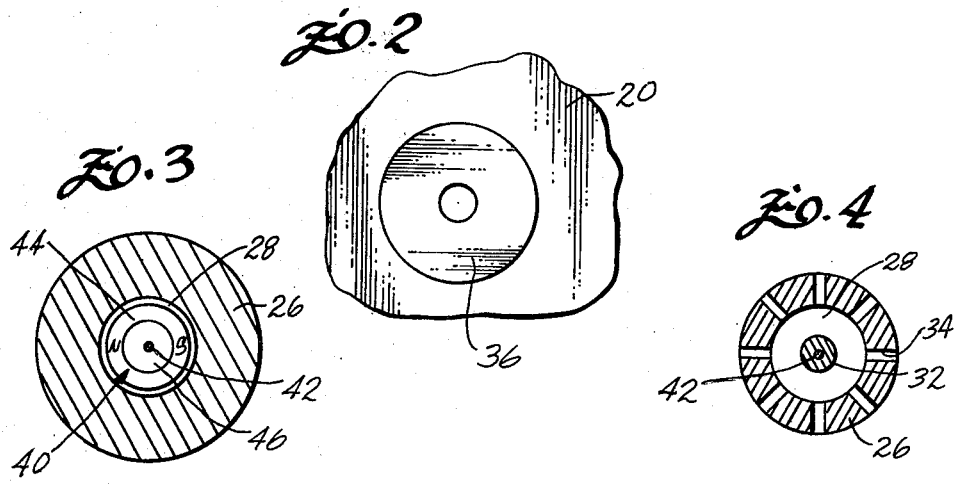

TEMPERATURE SENSITIVE VALVE

FIELD OF THE INVENTION

This invention relates to automatic valves for coffee makers and the like, and more particularly, is concerned with a magnetically actuated valve which opens and closes automatically in response to temperature.

BACKGROUND OF THE INVENTION

Automatic coffee brewers are well known in which water is preheated in a tank or vessel into which a predetermined quantity of cold water has been stored. When the water reaches the desired brewing temperature, it is released from the vessel and allowed to percolate down through the ground coffee into a pot or other container from which the fresh brewed coffee is poured. Two different types of valves have been used for releasing the water from the first vessel after it reaches the desired temperature. One type of valve uses a bimetal material for opening the valve when it is heated. The second type is a snap-action device also using bimetal which operates an over-center leverage system, allowing the valve to remain fully closed until the desired temperature is reached, at which time the valve snaps completely open. Both types of valves have exhibited unsatisfactory operating life when immersed in hot water due to a combination of electrolysis and lime deposits which cause failure or malfunction of the valve after a relatively short period of use. Thus there has been a need for a valve which exhibits a much longer operating life but which is inexpensive to manufacture and install.

SUMMARY OF THE INVENTION

The present invention is directed to an improved temperature sensitive valve for use in coffee brewers, or the like, which is sufficiently simple to manufacture and inexpensive to use and which nevertheless provides a high level of reliability. This is achieved by providing a valve for releasing heated fluid from a vessel when the fluid reaches a predetermined temperature, the valve comprising a valve body of nonmagnetic material adapted to be mounted in the bottom of the vessel, the valve body having a passage extending vertically for draining fluid from the vessel. An annular valve seat member mounted in the passage is made of a thermal-sensitive magnetic material which changes from a ferromagnetic state to a paramagnetic state as the temperature increases above a predetermined value, called the Curie point. A movable plug member positioned in the passage below the valve seat includes a permanent magnet for magentically attracting the plug to the valve seat member to close off the flow of fluid through the passage. The magnetic attraction is drastically attenuated at the Curie temperature when the valve seat material changes to the paramagnetic state, thus allowing the plug member to move away from the valve seat and the heated fluid to flow out of the vessel.

BRIEF DESCRIPTION OF THE DRAWINGS

For a more complete understanding of the invention reference should be made to the accompanying drawings, wherein:

FIG. 1 is a cross-sectional view of a coffee maker incorporating the valve of the present invention, the valve being enlarged for clarity;

FIG. 2 is a partial view showing the top of the valve;

FIG. 3 is a sectional view taken on the line 3—3 of FIG. 1; and

FIG. 4 is a sectional view taken on the line 4—4 of FIG. 1.

DETAILED DESCRIPTION

Referring to FIG. 1 in detail, there is shown a conventional coffee brewer including a pot 10 forming the lower section of the coffee brewer in which is nested a coffee basket 12. The top of the basket 12 has a radially projecting rim 14 which rests on the top edge of the pot 10. Ground coffee is placed in the bottom of the basket 12, as indicated at 16. The basket is perforated to allow water to pass down through the coffee and drip into the pot 10.

A water tank or vessel 18 fits on top of the rim 14. The vessel 18 has a bottom wall 20 in which is mounted an automatic valve assembly, indicated generally at 22. Suitable heating means, such as a Calrod unit, indicated at 24, may be used to heat the water in the vessel 18. The valve assembly 22, as hereinafter described in detail, operates to open when the temperature of the water in the vessel reaches the desired level of slightly below the boiling temperature. The valve assembly 22 releases the water in the vessel allowing it to percolate down through the coffee grounds and into the pot.

The valve assembly 22 includes a cylindrical valve body 26 which may be integral with the bottom 20 of the vessel 18, or may be welded or otherwise secured to the bottom 20. The cylindrical valve body has a vertical passage 28 which is closed at the lower end by a bottom wall 30. A sleeve portion 32 of the valve body projects upwardly from the bottom wall 30 along the central axis of the passage 28. A plurality of radial openings 34 allow discharge of fluid from the passage 28 into the interior of the coffee basket 12 from the vessel 18 when the valve is open. The size and number of the openings 34 can be varied to control the rate at which water is discharged. A valve for a 60-cup unit, for example, requires a much higher discharge rate than a 4-cup unit.

An annular valve seat member 36 is press-fitted or otherwise secured in the top of the valve body 26. The annular valve seat member has a central fluid discharge opening 38 axially aligned with the passage 28. A vertically movable valve plug element, indicated generally at 40, is positioned inside the passage 28 below the valve seat member 36. The valve plug assembly includes a pin or shaft 42 which is journaled in the sleeve 32 and is freely movable axially or rotatably in the sleeve 32, which acts as a guide. An annular magnet 44 is secured to the shaft 42. A washer 46 made of elastomeric material, such as a flexible silicone rubber, is supported on the end of the shaft 42 above the magnet 44. The washer 46 is frusto-conical in shape, the upper end being of smaller diameter than the opening 38. The valve is assembled by first inserting the shaft 42, with the magnet 44 and washer 46 in place, in the sleeve 32 and then pressing the valve seat member 36 into the upper end of the cylindrical portion 26 of the valve body.

The valve seat member 36 is molded or otherwise formed from a thermal ferrite material which has a Curie temperature of approximately 85° C. Above this temperature the thermal ferrite material is in a paramagnetic state, that is, it loses its magnetic properties. Such thermal ferrite materials are commercially available in specified shapes and sizes with the desired Curie point. The magnet 44 is in turn molded of a ferrite material having a high permeability and whose Curie temperature is well above the normal operating range of the valve. The magnet 44 is magnetically polarized in a direction transverse to the vertical axis of the shaft 42, that is, the magnet is polarized with the north and south poles at diametrically opposite positions. It has been found that this direction of polarization provides superior operation of the valve, although axial polarization may be used.

At temperatures below the Curie point, magnetic attraction between the magnet 44 and valve seat 36 is sufficient to lift the plug 40 toward the valve seat, in which position the conical washer 46 wedges into the opening 38 in the valve seat member 36. This closes the valve, preventing water from escaping from the vessel 18 into the coffee basket 12. As the water in the vessel 18 is heated, the water being in direct contact with the valve seat 36 causes the valve seat member to be heated above the Curie temperature. This causes the valve seat member 36 to lose its magnetic properties so that the plug 40 is no longer supported by the magnetic attraction between the magnet 44 and the valve seat member 36. This causes the plug 40 to drop down until the magnet 44 rests on top of the sleeve 32, allowing the water to escape from the vessel 18 through the passage 28 and radial openings 34 into the coffee basket 12. After the water is drained out the vessel 18 and the heating element 24 is turned off, the valve seat member 36 cools below the Curie temperature, at which point the plug 40 is lifted into the closed position by magnetic attraction between the magnet 44 and the valve seat member 36.

From the above description it will be seen that a temperature sensitive valve has been provided having a single moving part. The valve can be readily made of materials which are non-corrosive and the tolerances and general design in such that lime deposits will not interfere with the function of the valve. One advantage of the present valve is that it can be constructed entirely of non-metallic materials, the ferrite being a ceramic material. This enables the valve to be used in coffee makers, or the like, designed for heating by microwaves, as in a microwave oven. Another advantage is that the operating temperature of the valve can be regulated in one of two ways. One way is to select a ferrite with a different Curie temperature. However, to a limited extend the operating temperature can be modified by changing the gap between the magnet and the ferrite. This gap, being controlled by the shape of the conical washer 46, can be easily modified by changing the thickness of the washer, for example.

What is claimed is:

1. A thermally operated valve comprising a valve body having a fluid passage, a valve seat in the passage, the value seat being made of magnetic material having a predetermined Curie temperature above which the magnetic material is paramagnetic, a movable valve plug including a permanent magnet positioned in the passage, means guiding the plug into and out of engagement with the valve seat for closing and opening the plug, the magnet holding the plug against the valve seat by magnetic attraction at temperatures below the Curie temperature of the magnetic material and releasing the plug at a temperature above the Curie temperature of the magnetic material.

2. The value of claim 1 wherein the plug is positioned below the valve seat and is magnetically attracted upwardly against the valve seat at temperatures below the Curie temperature, the plug falling away from the valve seat when the temperature of the magnetic material is above the Curie temperature.

3. The valve of claim 2 wherein the permanent magnet of the valve plug is polarized in a direction transverse to the direction of movement of the plug.

4. The valve of claim 1 wherein the magnetic material of the valve seat is thermal ferrite.

5. A valve for releasing fluid from a vessel when the fluid reaches a predetermined temperature, comprising: a valve body of non-magnetic material adapted to be mounted in the bottom of the vessel, the valve body having a passage extending vertically for draining fluid from the vessel, an annular valve seat member mounted in the passage, the valve seat member being made of thermal sensitive magnetic material which changes from a ferromagnetic state to a paramagnetic state as the temperature increases above a predetermined value, a movable plug member positioned in the passage below the valve seat member, the plug member including a permanently magnetized magnet for attracting the plug to the valve seat member to close off the flow of fluid through the annular valve seat member, the plug being released by the magnet to open the valve when the valve seat member is heated by the fluid to the paramagnetic state.

6. Apparatus of claim 5 wherein the valve body includes means guiding the plug member for movement along a vertical path within said passage.

7. Apparatus of claim 5 wherein said plug member includes a conically shaped elastomeric portion extending upwardly in position to engage the annular valve seat member.

8. Apparatus of claim 5 wherein the magnet is magnetically polarized in a direction transverse to the direction of movement of the plug relative to the valve seat member.

* * * * *